United States Patent [19]

Nagahori

[11] 4,358,999
[45] Nov. 16, 1982

[54] TRANSFER TRUCK SYSTEM
[75] Inventor: Katsuhiro Nagahori, Chiba, Japan
[73] Assignee: SI Handling Systems, Inc., Easton, Pa.
[21] Appl. No.: 212,771
[22] Filed: Dec. 4, 1980
[30] Foreign Application Priority Data
Dec. 21, 1979 [JP] Japan .............................. 54-177918[U]
[51] Int. Cl.³ ............................................. B61B 13/12
[52] U.S. Cl. .................................................. 104/166
[58] Field of Search ........... 104/130, 165, 166, 172 R, 104/189, 190; 198/345, 472, 648

[56] References Cited
U.S. PATENT DOCUMENTS

| 402,993 | 5/1889 | Judson | 104/166 |
| 423,872 | 3/1890 | Judson | 104/166 |
| 3,871,303 | 3/1975 | Woodling | 104/173 R |
| 4,048,923 | 9/1977 | Giraud | 104/165 X |

Primary Examiner—Randolph Reese
Attorney, Agent, or Firm—Seidel, Gonda, Goldhammer & Panitch

[57] ABSTRACT

Straight sections of track each having a drive tube are coupled together by a curved track section. Between the tracks at the curved section, there is provided a series of drive shafts whose ends are not aligned with the ends of the drive shafts in the straight track sections. Driverless trucks are provided with at least two drive wheels for frictional contact with drive shafts in the straight track sections and a discrete drive wheel for cooperation with the drive shafts in the curved track section.

6 Claims, 4 Drawing Figures

TRANSFER TRUCK SYSTEM

BACKGROUND

Transfer truck systems of the type wherein a wheeled frame rides on rails and has at least two drive wheels pressed against a rotating drive shaft in parallel with the rails so that the force for propelling the truck is produced by frictional engagement between the drive wheels and the drive shafts is known. Plural drive wheels in series are provided in order that the truck may support heavy loads. If straight sections of track are connected together by a curved track section, and a series of drive shafts is provided for interconnection the ends of straight drive shafts, the drive wheels oppose each other or lose contact with said series of drive shafts. The present invention is directed to a solution for this problem.

SUMMARY OF THE INVENTION

The present invention relates to a transfer truck system of the type wherein a wheeled frame rides on rails and has at least two drive wheels pressed against a rotating drive shaft. The drive shaft is disposed in parallel with the rails and arranged so that the force for propelling the truck is produced by the frictional engagement between the drive wheels and the drive shaft. A plurality of drive wheels are provided for driving the truck along a straight section of track. The drive wheels are in series and parallel to the rails. At least one auxiliary drive wheel is provided for driving the truck at a curved section of the tracks. The auxiliary drive wheel is mounted on the truck in parallel with the first mentioned drive wheels. Drive shafts are provided in the curved section and so arranged that they are not in line with drive shafts in the straight section. The auxiliary drive wheel is utilized in combination with the drive shafts in the curved section for driving the truck through the curved section.

It is an object of the present invention to provide a transfer truck system wherein at least one auxiliary drive wheel is provided for driving a truck through a radius turn.

Other obvious will appear here and after.

For the purpose of illustrating the invention, there is shown in the drawings a form which is presently preferred; it being understood, however, that this invention is not limited to the precise arrangements and instrumentalities shown.

DETAILED DESCRIPTION—PRIOR ART

Figure 1:
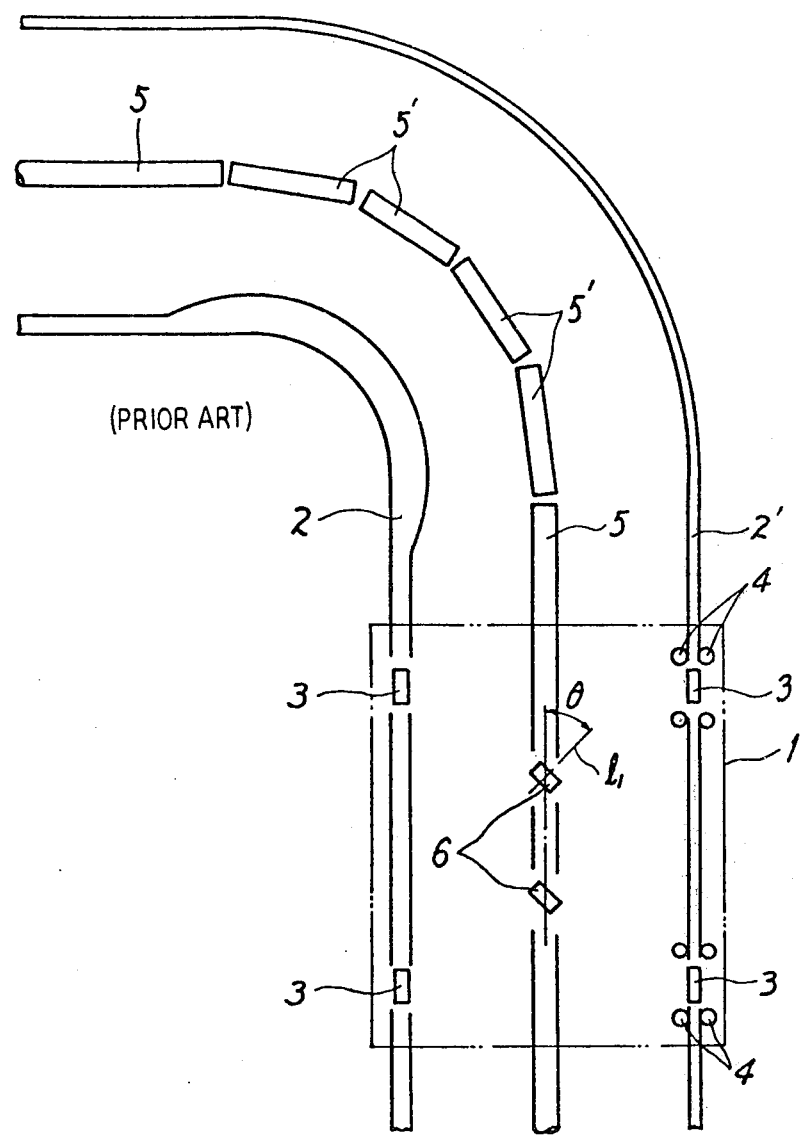
FIGS. 1 and 2 are plan views of two prior art transfer truck systems.
Figure 2:
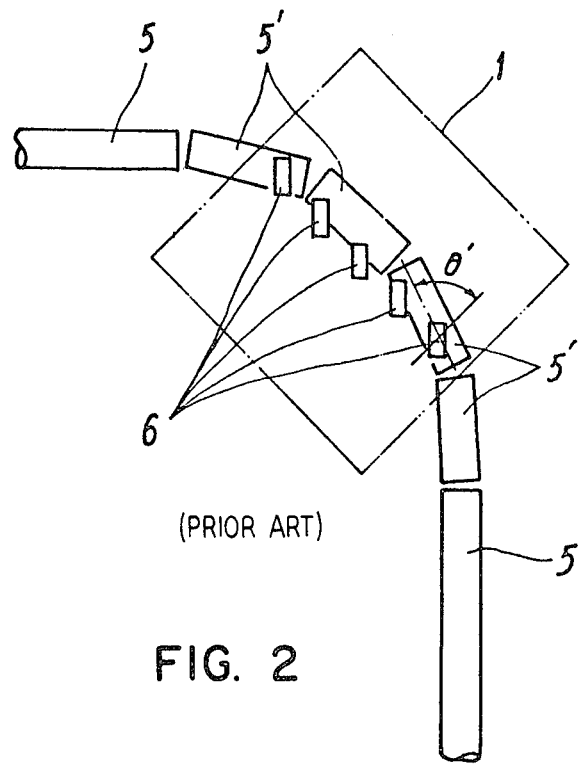
Figure 4:
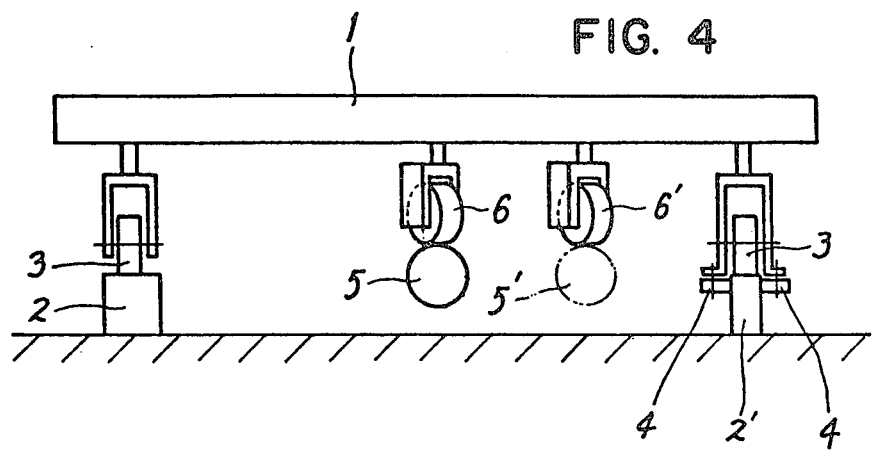
FIG. 4 is a sectional view taken along the line 4—4 in FIG. 3 and on an enlarged scale.

In FIGS. 1 and 2 there is shown plan views of prior art transfer truck systems. In FIG. 1, the truck designated numeral 1 is approaching a curved section which joins two straight sections. The truck 1 is mounted on swiveled support wheels 3 which travel along rails 2,2'. Guide wheels 4 are provided along one side of the truck 1 for cooperation with the rails 2'. The truck 1 has a pair of drive wheels 6 coupled together and operating in series for frictional rolling contact with the straight drive shafts 5 which rotate about their longitudinal axes. The ends of the drive shafts 5 are connected together by a plurality of drive shafts 5' which interconnect the ends of the drive shafts 5. As truck 1 negotiates the curved section it will stall since the drive wheels 6 will oppose one another.

In FIG. 2 there is shown another variation wherein the truck 1 has five drive wheels designated 6. When the truck 1 attempts to negotiate the curved section, as shown in FIG. 2, the first and last of drive wheels 6 oppose each other while the middle three drive wheels have lost frictional contact with the drive shafts 5' whereby there is an inconsistent driving force. The truck will stall when attempting to negotiate the curved section.

DETAILED DESCRIPTION OF INVENTION

Figure 3:
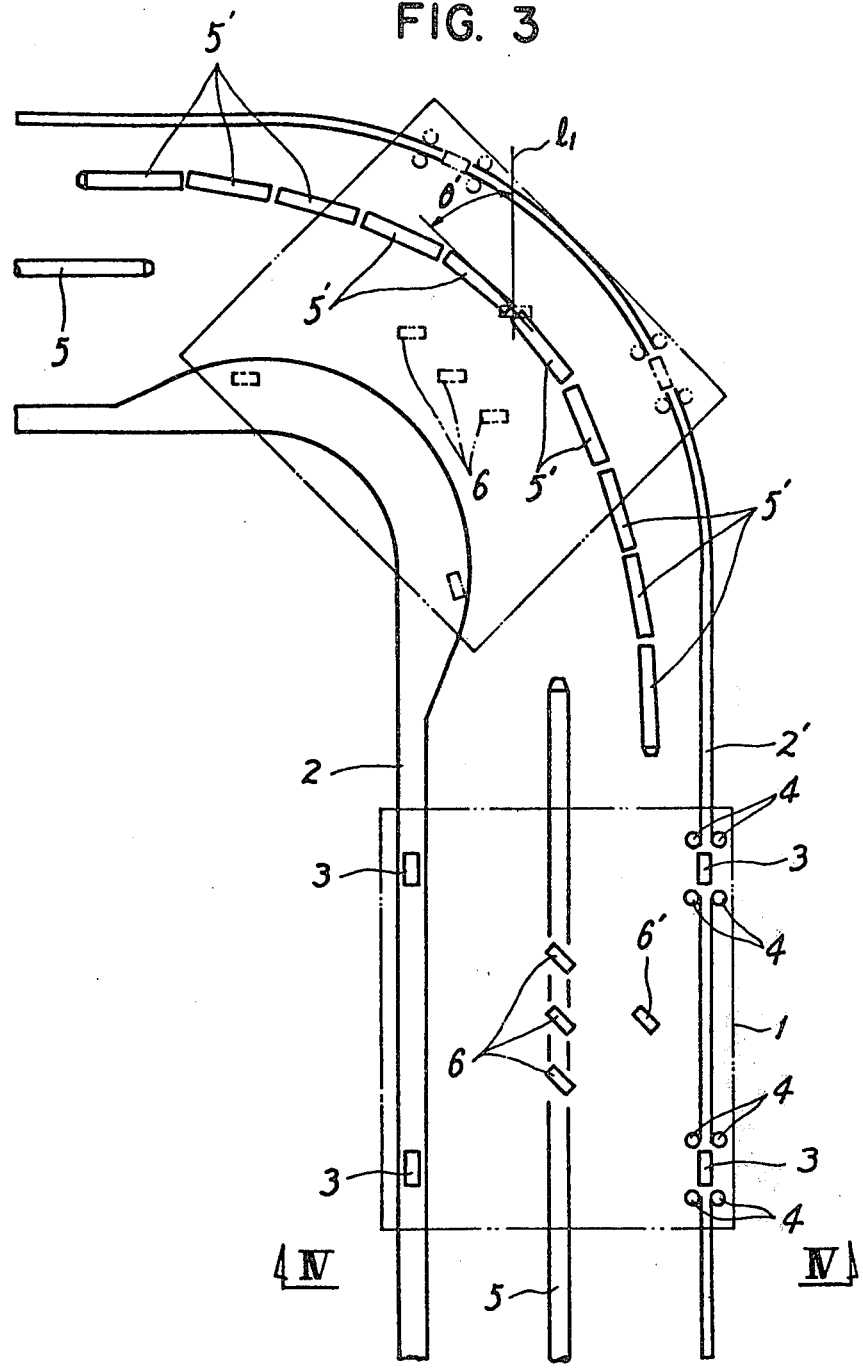
FIG. 3 is a plan view of a transfer system in accordance with the present invention.

As shown more clearly in FIG. 3, the solution to the problem is to provide drive shafts 5' in the curved section in a manner so that they do not extend between the ends of the straight drive shafts 5. As shown in FIG. 3, the drive shafts 5' are closer to the rail 2' instead of being equidistant from the rails 2,2'. The terminal drive shafts 5' have their ends closer to the rail 2' than the central drive shafts 5'. The truck 1 has an auxiliary drive wheel 6' positioned for contact with the drive shafts 5' whereby the truck will be powered through the curved section.

Each of the drive wheels 6 and 6' are per se conventional and rotate about a vertical axis while being biased by a spring not shown to a drive position. The track 2 is widened at the inside of the curved section for supporting the wheels 3 along one side of the truck 1. The ends of the drive shafts 5' overlap the adjacent ends of the straight drive shafts 5 so that there is a continuity of driving power. The radius of curvature of the curved section of drive tubes 5' is greater than the radius of curvature of the curved section of track 2.

The present invention may be embodied in other specific forms without departing from the spirit or essential attributes thereof and, accordingly, reference should be made to the appended claims, rather than to the foregoing specification, as indicating the scope of the invention.

I claim:

1. A transfer truck system of the type in which a driverless wheeled frame rides on rails and has drive wheels pressed against rotating drive shafts disposed in parallel with said rails so that the force for propelling the truck is produced by the frictional engagement between said drive wheels and said drive shafts, a plurality of drive wheels for driving the truck at a straight track section, said drive wheels being mounted on the wheeled frame in series while being in parallel with said rails, at least one auxiliary drive wheel being mounted on said frame in parallel with said first mentioned drive wheels, drive shafts in a curved section arranged so that they are not aligned with the drive shafts in said straight section, and only said auxiliary drive wheel being pressed against said drive shafts in said curved section when said truck traverses said curved section.

2. A system in accordance with claim 1 wherein the drive shafts in the curved section are closer to the outer one of the rails in the curved section.

3. A system in accordance with claim 1 wherein said wheeled frame rides on the rails by way of swivelly mounted wheels.

4. A driverless transfer truck for use in a system of the type in which a wheeled frame rides on rails and has drive wheels pressed against rotating drive shafts disposed in parallel with said rails so that the force for propelling the truck is produced by the frictional engagement between said drive wheels and said drive shafts, comprising a wheeled frame, a plurality of swivelled support wheels on said frame, a plurality of drive wheels for driving the truck at a straight track section, said drive wheels being mounted on the wheeled frame in series, at least one auxiliary drive wheel for driving the truck only at a curved section, said auxiliary drive wheel being mounted on said frame in parallel with said first mentioned drive wheels.

5. A transfer truck system of the type in which a driverless wheeled frame rides on rails and has drive wheels pressed against rotating drive shafts disposed in parallel with said rails so that the force for propelling the trucks is produced by the frictional engagement between said drive wheels and said drive shafts, a plurality of drive wheels for driving the truck at a straight track section, said drive wheels being mounted on the wheeled frame in series while being in parallel with said rails, at least one auxiliary drive wheel mounted on said frame in parallel with said first mentioned drive wheels, drive shafts in a curved section arranged so that they are not aligned with the drive shafts in said straight section, said auxiliary drive wheel being pressed against said drive shafts in said curved section when said truck traverses said curved section, the ends of said drive shafts in said curved section overlapping the ends of the drive shafts in the straight section so that there is continuity of driving power as the truck is driven through the curved section.

6. A system in accordance with claim 5 wherein said drive shafts in said curved section are closer to the outer one of said rails in the curved section and have a radius of curvature greater than the inner one of the rails in the curved section.

* * * * *